United States Patent
Shiraga

(10) Patent No.: US 8,947,720 B2
(45) Date of Patent: Feb. 3, 2015

(54) COMMUNICATION TERMINAL DEVICE, COMMUNICATION CONTROL METHOD, AND NON-TRANSITORY COMPUTER-READABLE MEDIUM STORING COMMUNICATION CONTROL PROGRAM

(71) Applicant: Naoto Shiraga, Nagoya (JP)

(72) Inventor: Naoto Shiraga, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/168,699

(22) Filed: Jan. 30, 2014

(65) Prior Publication Data

US 2014/0240762 A1 Aug. 28, 2014

(30) Foreign Application Priority Data

Feb. 28, 2013 (JP) ................................ 2013-039581

(51) Int. Cl.
*G06F 3/12* (2006.01)
(52) U.S. Cl.
CPC ............ *G06F 3/1206* (2013.01); *G06F 3/1255* (2013.01); *G06F 3/1292* (2013.01)
USPC ......... 358/1.15; 358/1.13; 358/1.6; 358/1.16; 713/150
(58) Field of Classification Search
None
See application file for complete search history.

(56) References Cited

U.S. PATENT DOCUMENTS

| | | | | |
|---|---|---|---|---|
| 6,369,909 B1 * | 4/2002 | Shima | ........................ | 358/1.15 |
| 6,940,615 B1 * | 9/2005 | Shima | ........................ | 358/1.15 |
| 7,191,236 B2 * | 3/2007 | Simpson-Young et al. | .. | 709/228 |
| 7,215,435 B2 * | 5/2007 | Oshima | ....................... | 358/1.15 |
| 7,605,939 B2 * | 10/2009 | Atobe et al. | ................. | 358/1.16 |
| 8,456,670 B2 * | 6/2013 | Kusakabe | .................... | 358/1.15 |
| 8,593,677 B2 * | 11/2013 | Nishimi et al. | .............. | 358/1.15 |
| 2005/0099962 A1 * | 5/2005 | Matsuda | ....................... | 370/254 |
| 2005/0117178 A1 * | 6/2005 | Atobe et al. | ................. | 358/1.15 |
| 2005/0168772 A1 * | 8/2005 | Kim | ............................. | 358/1.15 |
| 2011/0043857 A1 | 2/2011 | Hiroki | | |
| 2012/0268777 A1 * | 10/2012 | Fry | ............................. | 358/1.15 |

FOREIGN PATENT DOCUMENTS

JP 2007-166538 A 6/2007
JP 2009-251823 A 10/2009

* cited by examiner

*Primary Examiner* — Ashish K Thomas
(74) *Attorney, Agent, or Firm* — Scully, Scott, Murphy & Presser, P.C.

(57) ABSTRACT

There is provided a communication terminal device including a memory, a display, a selection operation accepting section, first and second wireless communication sections configured to perform data communication with a printer via first and second wireless communication, and a controller. In a case that the to-be printed file is a file in a particular non-support format, the first wireless communication section transmits the to-be printed file to a conversion device and obtains a to-be printed file, which has been converted to a support file at the conversion device. In a case that the second wireless communication is started and that the converted to-be printed image is not being obtained, a communication counterpart of the first wireless communication is changed to the printer. In a case that the converted to-be printed file is being obtained, the communication counterpart of the first wireless communication is maintained.

9 Claims, 9 Drawing Sheets

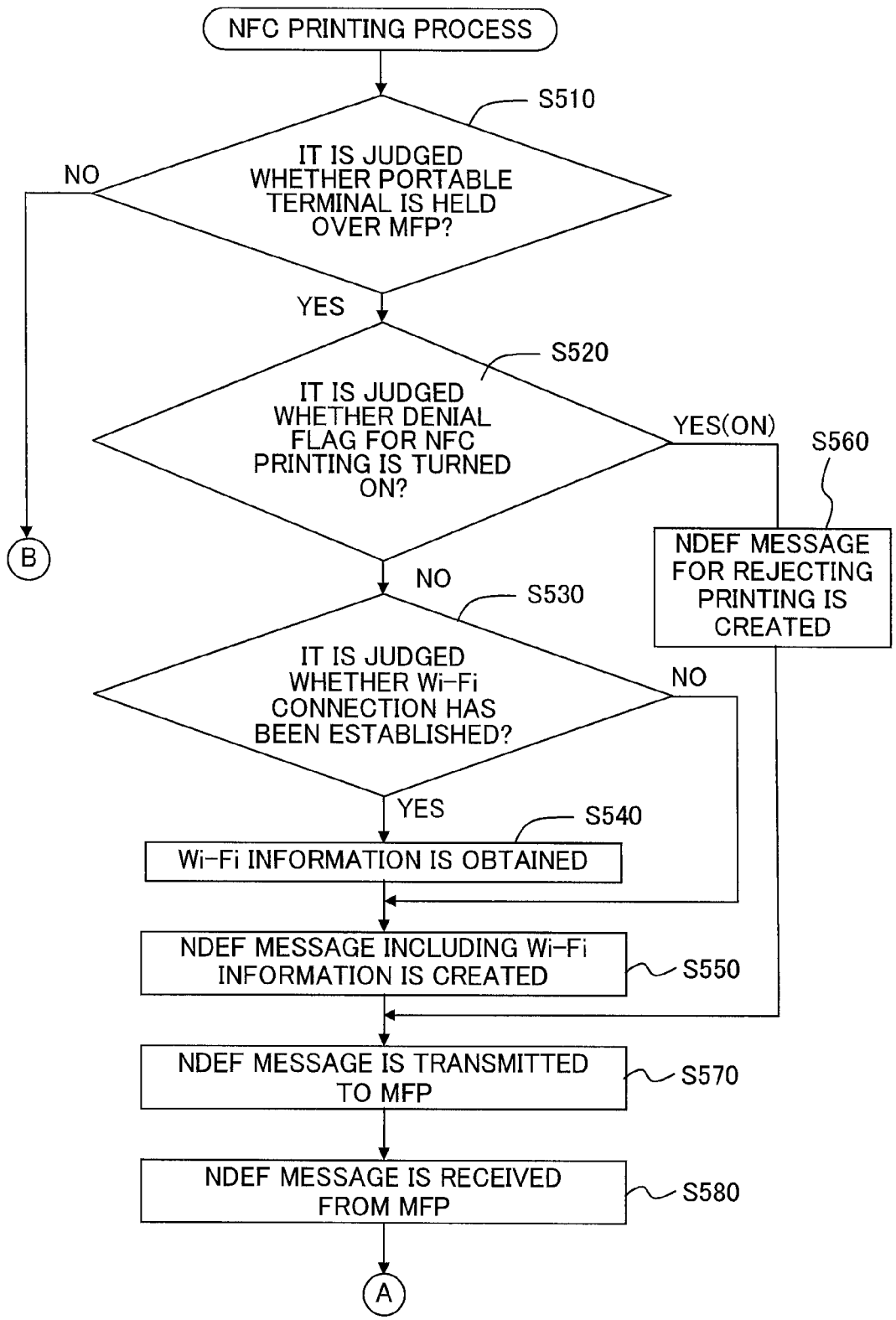

COMMUNICATION TERMINAL DEVICE, COMMUNICATION CONTROL METHOD, AND NON-TRANSITORY COMPUTER-READABLE MEDIUM STORING COMMUNICATION CONTROL PROGRAM

CROSS REFERENCE TO RELATED APPLICATION

The present application claims priority from Japanese Patent Application No. 2013-039581, filed on Feb. 28, 2013, the disclosure of which is incorporated herein by reference in its entirety.

BACKGROUND OF THE INVENTION

1. Field of the Invention

The present invention relates to a communication terminal device which is capable of performing wireless communications by a plurality of types of wireless communication systems.

2. Description of the Related Art

Conventionally, it has been suggested a wireless LAN connection method between two communication devices, each of which is capable of performing a wireless communication according to "Near Field Communication" protocol (hereinafter, referred to as "NFC") and a wireless communication according to wireless LAN protocol.

In particular, in a case that the two communication devices are allowed to approach closely to each other, the wireless communication by the NFC is started therebetween and the exchange of information required for a wireless LAN connection is performed. The wireless LAN connection between the two communication devices is established based on the exchanged information and a data communication by the wireless LAN is performed therebetween.

In recent years, portable communication terminal devices such as a multifunctional portable terminal and a tablet terminal have been in widespread use. By using the above technique, for example, the following can be achieved. That is, the wireless LAN communication is established between a communication terminal device and a printer via the NFC and then a printing data is transmitted from the communication terminal device to the printer via the wireless LAN to allow the printer to perform printing.

In order to print an image file and the like stored in the communication terminal device with the printer, it is required that a to-be printed file is processed to have a format which can be handled by the printer and the processed to-be printed file is transmitted to the printer. This data processing is generally performed by an Operating System (referred to as an OS) in the communication terminal device. The types of files which can be subjected to the data processing depend on the type of OS. Some OSes are capable of performing the data processing for various types of files, and other OSes perform the data processing for only limited types of files. An example of the former is Windows®(registered trademark of Microsoft Corporation) and an example of the latter is an Android®(registered trademark of Google Inc.) (the same is applied to the following description as well).

The Android is one of the major OSes installed in the portable communication terminal device in recent years. In the Android, for example, a file in JPEG format (hereinafter referred to as "JPEG file") is a support file supported by the OS, and the OS is capable of performing the data processing for printing of the JPEG file. On the other hand, files in PDF format, DOC format of WORD®(registered trademark of Microsoft Corporation) (the same is applied to the following description as well), and the like are non-support files which are not supported by the OS, and the OS can not perform the data processing for the printing of each of the non-support files. As described above, since the OS can not perform the data processing for the printing of the non-support file, the non-support file can not be transmitted to the printer and can not be subjected to the printing without any process.

Therefore, even when the wireless LAN communication can be established between the communication terminal device and the printer according to the NFC protocol, the types of files, which can be transmitted to the printer and then can be printed, are limited by the OS.

SUMMARY OF THE INVENTION

The present teaching has been made taking the foregoing circumstances into consideration, an object of which is to provide a communication terminal device which is capable of transmitting wirelessly even a file in a format, which is not supported by an OS installed in the communication terminal device, to a printer and causing the printer to perform printing.

According to an aspect of the present teaching, there is provided configured to communicate with a printer, the device including:

a memory configured to store at least one file;

a display configured to display information;

a selection operation accepting section configured to accept a selection operation for selecting specific information from among the information displayed on the display;

a first wireless communication section configured to perform data communication with the printer by first wireless communication in compliance with first wireless communication protocol;

a second wireless communication section configured to perform the data communication with the printer by second wireless communication in compliance with second wireless communication protocol which is different from the first wireless communication protocol; and a controller configured to execute:

displaying the at least one file stored in the memory on the display;

setting up a file, which is selected by the selection operation accepting section from among the at least one file displayed on the display, as a to-be printed file to be printed by the printer;

causing the first wireless communication section to transmit, in a case that the to-be printed file is a file in a particular non-support format, the to-be printed file to a conversion device and causing the first wireless communication section to obtain a to-be printed file, which has been converted to a file in a particular support format at the conversion device, from the conversion device;

changing a communication counterpart of the first wireless communication to the printer in a case that the second wireless communication between the communication terminal device and the printer is started after the setting of the to-be printed file and that the converted to-be printed image is not being obtained from conversion device, and maintaining the communication counterpart of the first wireless communication in a case that the converted to-be printed file is being obtained from conversion device; and causing the first wireless communication section to transmit the to-be printed file in the support format to the printer in the case that the communication counterpart of the first wireless communication has been changed to the printer.

According to the communication terminal device of the present teaching configured as described above, in the case that the file in the non-support format is converted to the file in the support format by the conversion device, the wireless communication counterpart of the first wireless communication is not switched from the conversion device to the printer until the converted to-be printed file has been completely obtained, even when the second wireless communication is started. That is, the connecting state with the conversion device via the first wireless communication is maintained until the file converted to have the support format has been completely obtained.

Thus, even when the wireless communication with the printer via the second wireless communication is started while the file is being converted at the conversion device, the wireless communication with the conversion device via the first wireless communication is maintained and the converted file can be obtained from the conversion device via the first wireless communication.

Each of the processes executed by the controller of the communication terminal device of the present teaching can be achieved as a communication control program for causing the computer to execute each of the processes. The present teaching can be applied to a non-transitory computer-readable medium storing such a communication control program.

BRIEF DESCRIPTION OF THE DRAWINGS

FIGS. 6A and 6B show a flowchart showing a NFC printing process executed by the portable terminal

DESCRIPTION OF THE PREFERRED EMBODIMENTS

Hereinafter, an explanation will be made about a preferred embodiment of the present teaching based on drawings. The present teaching is not limited to specific methods, mechanisms, structures, and the like provided in the embodiment described below, but the present teaching can adopt various embodiments without departing from the scope of the present teaching. Further, an embodiment, in which a part of the configuration in the embodiment described below is omitted as long as the problem can be solved, is also the embodiment of the present teaching.

Figure 1:
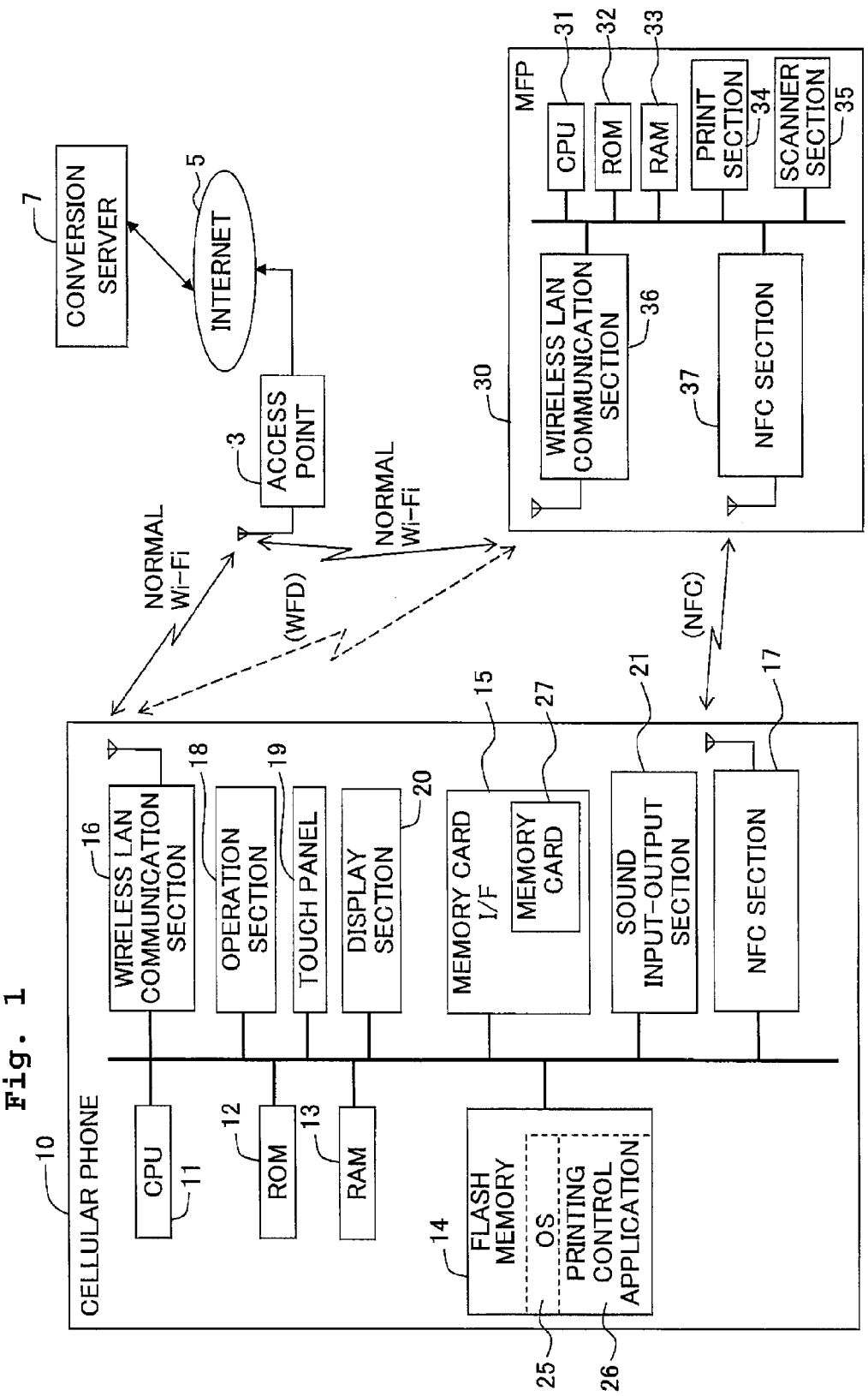
FIG. 1 is a configuration diagram showing a schematic configuration of a NFC printing system according to an embodiment.

As shown in FIG. 1, an NFC printing system 1 of this embodiment mainly includes a portable terminal 10, a Multi Function Peripheral 30 (hereinafter, referred to as an MFP 30), and a conversion server 7.

The portable terminal 10 as the communication terminal device is wirelessly connectable with an access point 3 by wireless LAN, can be connected to an internet 5 via the access point 3, and can be connected to the conversion server 7, which will be described later on, via the internet 5. In the following, a device and a system such as the internet 5 and a server which is connectable via the internet 5 are also referred to as "cloud". The wireless LAN is a communication system which is defined, for example, in IEEE802.11a/b/g/n standard.

The portable terminal 10 is wirelessly connectable with the MFP 30 by the wireless LAN. More specifically, the wireless LAN connection can be performed between the portable terminal 10 and the MFP 30 via the access point 3, or wireless LAN connection can be directly performed therebetween without the access point 3.

The wireless LAN of this embodiment is a system in conformity to Wi-Fi®(registered trademark of Wi-Fi Alliance) (the same is applied to the following description as well). Therefore, in the following description, the wireless LAN via the access point 3 is also referred to as "normal Wi-Fi". For the Wi-Fi in which the portable terminal 10 directly communicates with the MFP 30 without the access point 3, the specification thereof is drawn up as Wi-Fi Direct®(registered trademark of Wi-Fi Alliance) (the same is applied to the following description as well). Thus, in the following description, the Wi-Fi (wireless LAN) in conformity to Wi-Fi Direct is also referred to as "WFD". The wireless data communication by the NFC can be also performed between the portable terminal 10 and the MFP 30. In the NFC printing system 1 of this embodiment, it is possible to perform a NFC printing in which the portable terminal 10 utilizes the wireless communication by the NFC to establish Wi-Fi connection with the MFP 30, and various types of files in the portable terminal 10 are transmitted to the MFP 30 via the Wi-Fi to perform the printing by the MFP 30.

As shown in FIG. 1, the portable terminal 10 includes a CPU 11, a ROM 12, a RAM 13, a flash memory 14, a memory card interface 15 (hereinafter referred to as "memory card I/F 15"), a wireless LAN communication section 16, an NFC section 17, an operation section 18, a touch panel 19, a display section 20, a sound input-output section 21, and the like.

The CPU 11 performs various processes based on various programs, data, and the like stored in the ROM 12, the flash memory 14, a memory card 27 installed to the memory card I/F 15, etc. As described later on, various processes include a print accepting process shown in FIGS. 2A and 2B and an NFC printing process shown in FIGS. 6A and 6B. These processes, however, are merely examples and the present teaching is not limited to these processes. The ROM 12 is a known non-volatile memory and the RAM 13 is a known volatile memory.

The flash memory 14 is a non-volatile memory in which a storage content can be rewritten. In the flash memory 14, various programs, data, and the like including an OS 25 and a printing control application 26 (hereinafter referred to as "printing app 26") are stored.

The OS 25 is the basic software achieving the standard function of the portable terminal 10. In this embodiment, the OS 25 is the Android. The printing app 26 as a communication control program is an application achieving the NFC printing as described above, and includes the programs for performing processes such as the print accepting process (FIGS. 2A and 2B) and the NFC printing process (FIGS. 6A and 6B) which will be described later. The printing app 26 is provided by a vendor of the MFP 30 and is installed in the portable terminal 10 by a user. The print control app 26 can be provided in various ways. For example, the print control app 26 can be stored in a server computer (not shown) and the print control app 26 can be downloaded from the server computer by the portable terminal 10.

Hereinafter, in some cases, the CPU 11 executing a program such as various applications and the OS 25 is described simply as the name of program executed. For example, the term "application" means "the CPU 11 executing the application" in some cases.

Each of the applications (including the printing app 26) installed in the portable terminal 10 calls API of the OS 25, and then data to be transmitted to each configuration of the portable terminal 10 such as the memory card I/F 15, the wireless LAN communication section 16, the NFC section 17, the operation section 18, the touch panel 19, the display section 20, and the sound input-output section 21 is inputted to and outputted from the OS 25.

The memory card I/F 15 is an interface to which the non-volatile memory card 27 is installed, and controls writing or reading of data with respect to the memory card 27. The memory card 27 is an SD Card® (registered trademark of SD Association) in this embodiment. In the memory card 27, for example, a file downloaded via the internet 5 and an attached file received by an email are stored.

The wireless LAN communication section 16 is a circuit for connecting the portable terminal 10 to another device via the Wi-Fi (normal Wi-Fi or WFD). The wireless LAN communication section 16 enables the wireless communication by the normal Wi-Fi between the portable terminal 10 and the access point 3. Further, the wireless LAN communication section 16 enables the wireless communication by the normal Wi-Fi, between the portable terminal 10 and a device on the internet 5 or between the portable terminal 10 and the MFP 30, via the access point 3. Furthermore, the wireless LAN communication section 16 also enables the wireless communication by the WFD between the portable terminal 10 and the MFP 30.

The NFC section 17 is a circuit for performing NFC connection between the portable terminal 10 and the MFP 30. The NFC section 17 enables the wireless communication by the NFC between the portable terminal 10 and the MFP 30. A range in which the wireless communication by the NFC can be performed is a very short distance (for example, within ten to twenty centimeters). When the user brings the portable terminal 10 close to the MFP 30 so that a distance between an antenna of the NFC section 17 of the portable terminal 10 and an antenna of a NFC section 37 of the MFP 30 is within a communicable range, a particular NFC is started therebetween and then the Wi-Fi connection between the portable terminal 10 and the MFP 30 is performed.

In the present description, in a case that the phrase "brings the portable terminal 10 close to the MFP 30" or "holds the portable terminal 10 over the MFP 30" is used in the description of the positional relation between the portable terminal 10 and the MFP 30, the phase means that the portable terminal 10 is brought closer to the MFP 30 so that the NFC can be performed therebetween, unless otherwise noted.

The operation section 18 is a hardware key provided in the casing of the portable terminal 10, and setting information and instructions are inputted in the portable terminal 10 through the operation section 18 by operation of the user. The touch panel 19 is provided to be overlaid on the display section 20 and the setting information and instructions are inputted in the portable terminal 10 by touch operation of the user, etc. The display section 20 displays information and various screens such as a menu screen for selecting document files shown in FIG. 3 and a preview screen shown in FIG. 4. The sound input-output section 21 is a sound input-output device including a microphone, a speaker, and the like.

The Android as the OS 25 installed in the portable terminal 10 supports at least a JPEG file and a text file and is capable of displaying each of the preview screens. Further, the Android is capable of performing a variety of processing of the support file required for printing by the MFP 30. In particular, the Android is provided with various APIs for processing the JPEG file and the text data into a file for printing and a data for printing.

On the other hand, the Android does not support a file in a particular format such as the PDF format, the DOC format of WORD, and XLS format of Excel® (registered trademark of Microsoft Corporation). That is, the Android does not have an API for processing each of the non-support files into a file for printing. The non-support file can be introduced and stored in the portable terminal 10 via various manners. For example, the non-support file can be stored by obtaining the non-support file through the communication with another information communication terminal and obtaining the non-support file as the attached file of the email. However, since the non-support file is not supported by the OS 25, a standard function of the OS 25 can not perform the preview and the data processing for printing of the non-support file. In the present description, the non-support file, which is not supported by the OS is also referred to as a "document file". For example, the document file is exemplified by files such as the file in the PDF format, the file in the DOC format of WORD, and the file in the XLS format of Excel.

In a case that the user starts up the printing app 26 of the portable terminal 10 to select a print function, the printing app 26 searches printable file(s) from among various files stored in the portable terminal 10 and displays a list of the printable files. In a case that the user selects a desired file as a to-be printed file from the list of the printable files, the printing app 26 previews the selected file. However, in a case that the selected file is the non-support file and that the selected file is not converted into the JPEG file by the conversion server 7 which will be described later, no preview screen is displayed.

In a case that the user holds the portable terminal 10 over the MFP 30 after the selection of the file, the printing app 26 performs a particular communication with the MFP 30 via the NFC to establish the normal Wi-Fi connection between the portable terminal 10 and the MFP 30. Then, the printing app 26 allows the OS 25 to perform the processing of the selected file and transmits the processed file to the MFP 30 via the normal Wi-Fi. Accordingly, the selected file is printed by the MFP 30.

Not only the support file such as the JPEG file but also the non-support file such as the file in the PDF format (hereinafter referred to as "PDF file") can be previewed, displayed in thumbnailed form, transmitted to the MFP 30, and printed by executing the printing app 26.

As described above, the standard function of the OS 25 of the portable terminal 10 can not preview the non-support file, display the non-support file in the thumbnailed form, perform the data processing for printing of the non-support file, and the like. Thus, other than the file which has already been converted into the JPEG file by the conversion server 7, only the file information (for example, file name) of the non-support file is displayed in a state that the printing app 26 is started to display a file list screen.

In view of this, the printing app 26 achieves the preview, the display in the thumbnailed form, etc., of the non-support file by the following procedures using the conversion server 7 as a conversion device. That is, the conversion server 7 provided on the cloud has a function for converting the non-support file such as the PDF file uploaded via the internet 5 into the support file and then returning the converted support file to a source device. In this embodiment, the conversion server 7 converts the non-support file such as the PDF file into the JPG file. In a case that the user selects the non-support file as the to-be printed file, the printing app 26 uploads the selected non-support file to the conversion server 7 on the cloud via the normal Wi-Fi. In a case that the conversion server 7 receives the non-support file from the portable terminal 10, the conversion server 7 converts the non-support file into the JPEG file to return the converted JPEG file to the portable terminal 10. In a case that the non-support file includes a plurality of pages, the conversion server 7 generates the JPEG file for each page to return each JPEG file to the portable terminal 10 sequentially.

In a case that the printing app 26 of the portable terminal 10 uploads the non-support file and then downloads the JPEG file, which is obtained by converting the non-support file, from the conversion server 7, the printing app 26 previews the JPEG file. In this situation, the file, which was originally the non-support file, has been converted into the support file and is displayed. The support file can be subjected to the data processing by the OS 25 and can be printed by the MFP 30.

In a case that the user holds the portable terminal 10 over the MFP 30 in a state that the JPEG file desired to be printed is previewed, the printing app 26 transmits the JPEG file to the MFP 30 via the Wi-Fi after the data processing by the OS 25.

The MFP 30 as a printer is a multifunction peripheral apparatus having a plurality of functions such as the printer function, the scan function, and the copy function. As shown in FIG. 1, the MFP 30 includes a CPU 31, a ROM 32, a RAM 33, a print section 34, a scanner section 35, a wireless LAN communication section 36, an NFC section 37, and the like.

The CPU 31 executes control of each of the sections in the MFP 30 and various calculations in accordance with various programs and data stored in the ROM 32. The RAM 33 is used as a main memory and the like directly accessed from the CPU 31. The print section 34 prints an image onto a recording medium such as a print paper. The scanner section 35 is provide with an image sensor and reads the image of a document to generate an image data representing the image.

The wireless LAN communication section 36 is a circuit for connecting the MFP 30 to another device via the normal Wi-Fi or the WFD similar to the wireless LAN communication section 16 of the portable terminal 10. The wireless LAN communication section 36 enables the wireless communication by the normal Wi-Fi between the MFP 30 and the access point 3. That is, the wireless LAN communication section 36 enables the wireless communication by the normal Wi-Fi between the MFP 30 and the portable terminal 10 via the access point 3. Further, the wireless LAN communication section 36 also enables the wireless communication by the WFD between the portable terminal 10 and the MFP 30.

The NFC section 37 is a circuit for performing NFC connection between the MFP 30 and the portable terminal 10 similar to the NFC section 17 of the portable terminal 10. The NFC section 37 enables the wireless communication by the NFC between the MFP 30 and the portable terminal 10.

In a case that the NFC between the MFP 30 and the portable terminal 10 is started, the Wi-Fi connection between the portable terminal 10 and the MFP 30 is established after the Wi-Fi connection condition of the portable terminal 10 is confirmed. In this embodiment, the Wi-Fi connection between the portable terminal 10 and the MFP 30 is the normal Wi-Fi connection. In a case that the normal Wi-Fi connection between the MFP 30 and the portable terminal 10 is established, a printing data is transmitted from the portable terminal 10 to the MFP 30 via the normal Wi-Fi. In a case that the MFP 30 receives the printing data, an image representing the printing data is printed.

In a case that the user holds the portable terminal 10 over the MFP 30 to perform the NFC printing, the particular process such as the communication process and the like are generally performed in accordance with the following procedures between the portable terminal 10 and the MFP 30. At first, Wi-Fi information (presence or absence of the Wi-Fi connection, information of a destination, and the like) of the portable terminal 10 and printing instruction are transmitted from the portable terminal 10 to the MFP 30 by the NFC. In a case that the MFP 30 receives the Wi-Fi information from the portable terminal 10, the MFP 30 compares the Wi-Fi information of the portable terminal 10 with Wi-Fi information of the MFP 30 to confirm whether or not the Wi-Fi connection between the MFP 30 and the portable terminal 10 has been already established. In a case that the Wi-Fi connection between the MFP 30 and the portable terminal 10 has been already established, the MFP 30 creates a particular command for achieving the printing instruction transmitted from the portable terminal 10. In a case that the Wi-Fi connection between the MFP 30 and the portable terminal 10 is not established, the MFP 30 creates information (referred to as normal Wi-Fi information) required for the normal Wi-Fi connection such as SSID, and then creates a command required for the Wi-Fi connection. Then, the MFP 30 transmits the created command to the portable terminal 10 via the NFC. Next, the portable terminal 10 performs the normal Wi-Fi connection with the MFP 30 in accordance with the received command. In this situation, in a case that the Wi-Fi connection with the MFP 30 has been already established, the Wi-Fi connection is left as it is and the portable terminal 10 maintains the Wi-Fi connection condition. On the other hand, in a case that the Wi-Fi connection with the MFP 30 is not yet established, the portable terminal 10 performs the normal Wi-Fi connection with the MFP 30. In a case that a Wi-Fi connection between the portable terminal 10 and a communication device other than the MFP 30 has been established, the portable terminal 10 switches from the Wi-Fi connection with the communication device to the normal Wi-Fi connection with the MFP 30. In a case that the Wi-Fi connection with the MFP 30 has been established after the created command transmitted from the MFP 30 has been received, the portable terminal 10 transmits the printing data via the Wi-Fi to allow the MFP 30 to perform the printing.

As described above, in a case that the user holds the portable terminal 10 over the MFP 30, the Wi-Fi connection is established therebetween. The Wi-Fi connection between the portable terminal 10 and the MFP 30 is not connected with the internet 5 and is merely a Wi-Fi connection for performing data communication therebetween.

It is assumed that the portable terminal 10 is connected to the internet 5 by the normal Wi-Fi via the access point 3 before the portable terminal 10 is held over the MFP 30. In this situation, the Wi-Fi connection of the portable terminal 10 is switched from the connection to the internet 5 to the connection to the MFP 30 by holding the portable terminal 10 over the MFP 30.

In a case that the Wi-Fi connection is switched from the connection to the internet 5 to the connection to the MFP 30 by holding the portable terminal 10 over the MFP 30 as described above, the following problem occurs in the NFC printing. Here, it is considered a case as follows. That is, in order to print the non-support file in the portable terminal 10 by the MFP 30, the user holds the portable terminal 10 over the MFP 30 while the printing app 26 is uploading the non-support file to the conversion server 7, namely, in a case that the Wi-Fi connection between the conversion server 7 and the portable terminal 10 has already been established. In this situation, the Wi-Fi connection of the portable terminal 10 is switched from the connection with the conversion server 7 to the connection with the MFP 30. In other words, the connection with the conversion server 7 is disconnected. Then, the file conversion at the conversion server 7 is discontinued and the portable terminal 10 can not receive the converted JPEG file. Thus, the printing by the MFP 30 can not be performed.

In view of this, the printing app 26 of this embodiment is configured as follows. That is, in a case that the non-support file is selected in the portable terminal 10, the Wi-Fi connection is not switched even when the portable terminal 10 is held over the MFP 30 until the conversion into the JPEG file by the conversion server 7 and the download thereof have been completed.

Figure 2A:
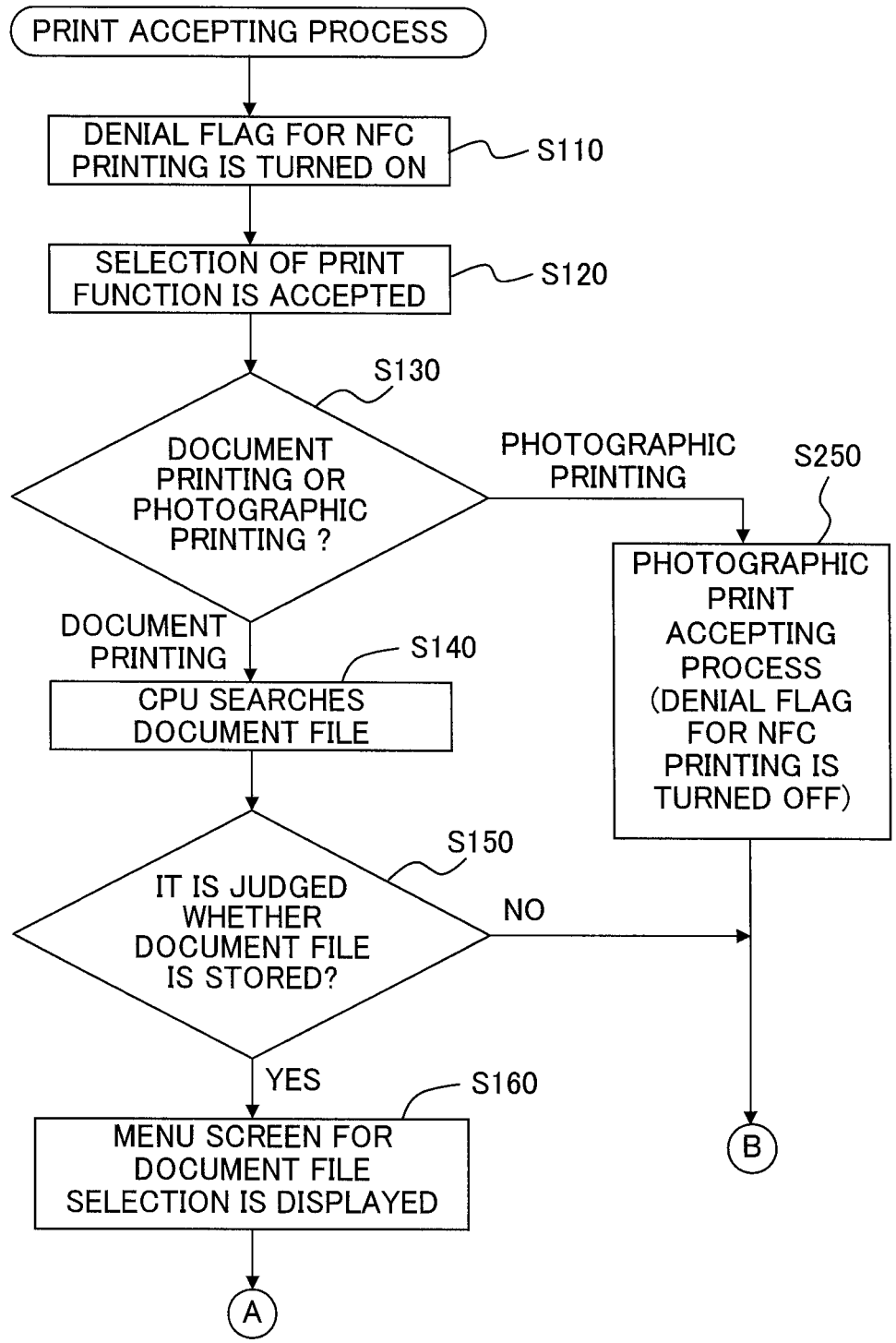
FIGS. 2A and 2B show a flowchart showing a print accepting process executed by a portable terminal
Figure 2B:
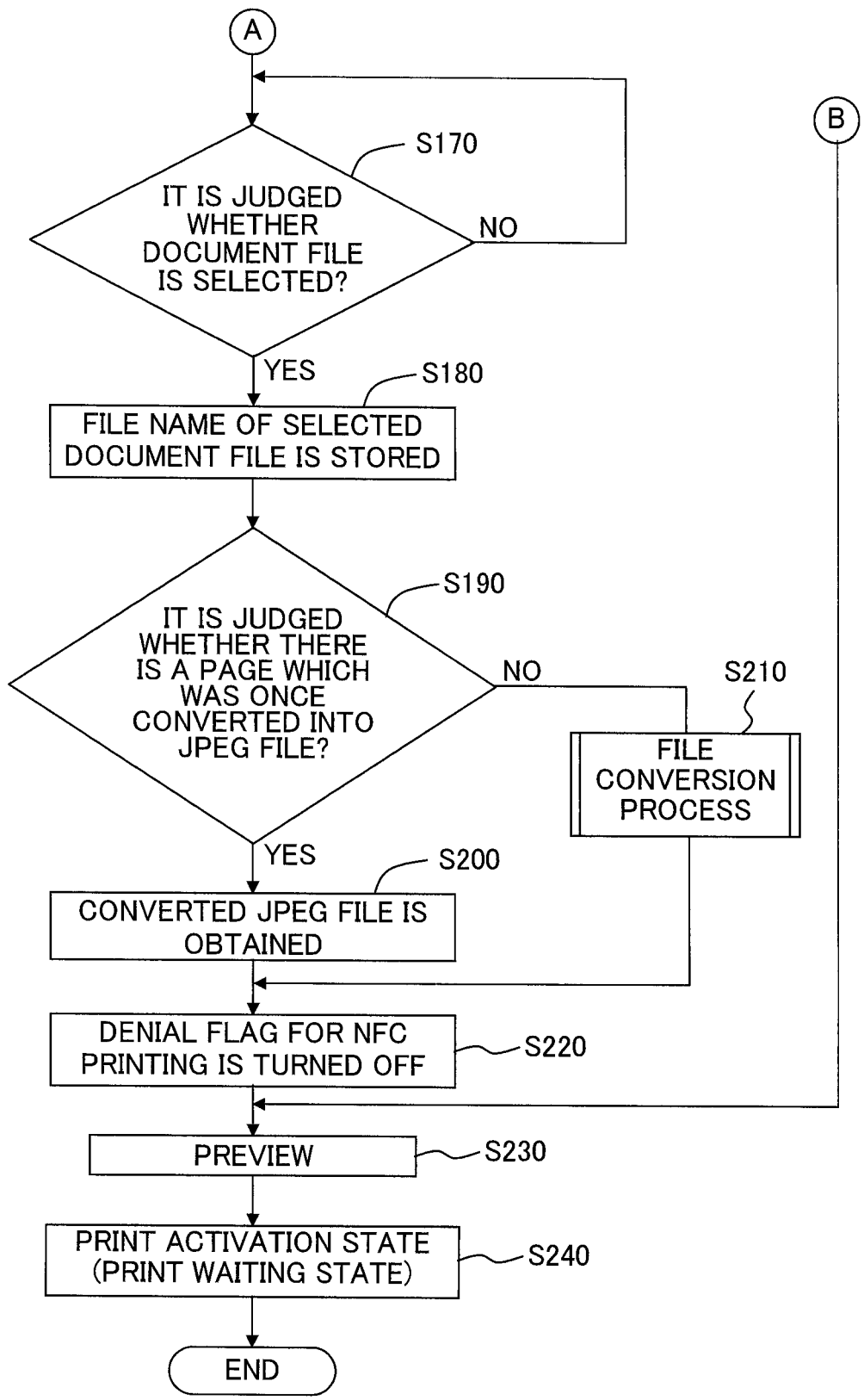

The print accepting process, of the main two processes executed by the CPU 11 of the portable terminal 10 for achieving the NFC printing, will be explained with reference to FIGS. 2A and 2B. The print accepting process shown in FIGS. 2A and 2B is one of programs configuring the printing app 26. In a case that a particular input operation for achieving the NFC printing is performed by the user after the operation of the CPU 11 of the portable terminal 10 is started, the CPU 11 of the portable terminal 10 executes the print accepting process shown in FIGS. 2A and 2B.

In a case that the print accepting process shown in FIGS. 2A and 2B is started, the CPU 11 allows a denial flag for an NFC printing to be turned on in step S110 (hereinafter, the phrase of "in step S110" is referred to as "in S110" for short). The denial flag for the NFC printing is referred to when the portable terminal 10 is held over the MFP 30 (see S520 in FIGS. 6A and 6B as will be described later).

In S120, an input operation executed by the user to select a print function is accepted. In this embodiment, the user is allowed to select any of a document printing and a photographic printing. The document printing is a function for printing the "document file", which is the non-support file such as the files in the PDF format and the DOC format, by the MFP 30. The photographic printing is a function for printing the support file such as the JPEC file by the MFP 30.

In S130, the content accepted in S120 is judged, namely, it is judged which one of the document printing and the photographic printing is selected. In a case that the document printing is selected, the process proceeds to S140. In a case that the photographic printing is selected, the process proceeds to S250.

In the photographic print accepting process of S250, the following processes are executed. The CPU 11 searches the JPEG file from among various files stored in the portable terminal 10 and displays a list of the JPEG files. Then, in a case that the user selects a to-be printed JPEG file, the CPU 11 previews the JPEG file (S230) and enters a print waiting state (S240). That is, the CPU 11 allows the denial flag for the NFC printing to be turned off and waits until the portable terminal 10 is held over the MFP 30. As described above, after the process of S250, the process proceeds to S230.

In a case that the process proceeds to S140 after the document printing is selected, the document file stored in the portable terminal 10 is searched. In S150, it is judged whether or not the document file is stored based on the search result in S140. In a case that no document file is stored, the print accepting process is completed. In a case that the document file is stored, the process proceeds to S160. In S160, it is displayed the menu screen for document file selection in which a list of the searched document files is displayed.

Figure 3:
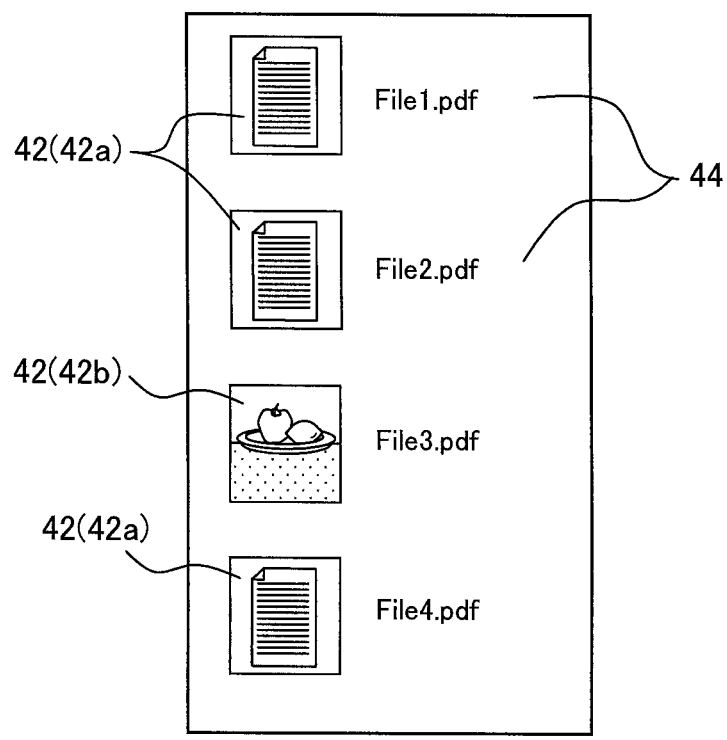
FIG. 3 shows an illustrative view illustrating an example of a menu screen for document file selection displayed on the portable terminal.

FIG. 3 shows an example of the menu screen for document file selection which is displayed on the display section 20 by the process in S160. The menu screen for document file selection is a screen in which each icon image 42 corresponding to the searched document file and each file name 44 are shown being correlated with each other. For a file, of the document files, of which thumbnail data is not stored, a particular icon image 42a is displayed. In this case, the user guesses the content of file corresponding to the icon image 42 based only on the file name 44.

For the file of which thumbnail data is stored, a thumbnail (reduced-size image) 42b corresponding to the thumbnail data is displayed as the icon image 42. Therefore, the user is capable of guessing the content of file corresponding to the icon image 42 based on the thumbnail 42b in addition to the file name 44.

Since the document file is the non-support file, the OS 25 can not create a thumbnail data of the document file and thus there is no thumbnail data of the document file. However, in a case that the document file was once selected and converted into the JPEG file by the conversion server 7, the OS 25 is capable of creating the thumbnail based on the JPEG file and then storing it. Thus, there is the thumbnail data.

The user is capable of selecting a to-be printed document file by selecting and touching an icon image 42, of the icon images 42 displayed in the menu screen for document file selection, which corresponds to the file desired to be printed.

In S170, it is judged whether or not the to-be printed document file is selected. In a case that the to-be printed document file is selected, the file name of the selected document file is stored in S180. In S190, it is judged whether or not there is a JPEG file corresponding to the selected document file. That is, it is judged whether or not there is a page which was once converted into the JPEG file by the conversion server 7. In a case that there is the page which was once converted into the JPEG file, since the document file is not required to be converted by the conversion server 7, the JPEG file converted in the past is obtained (S200) and the process proceeds to S220.

Figure 4:
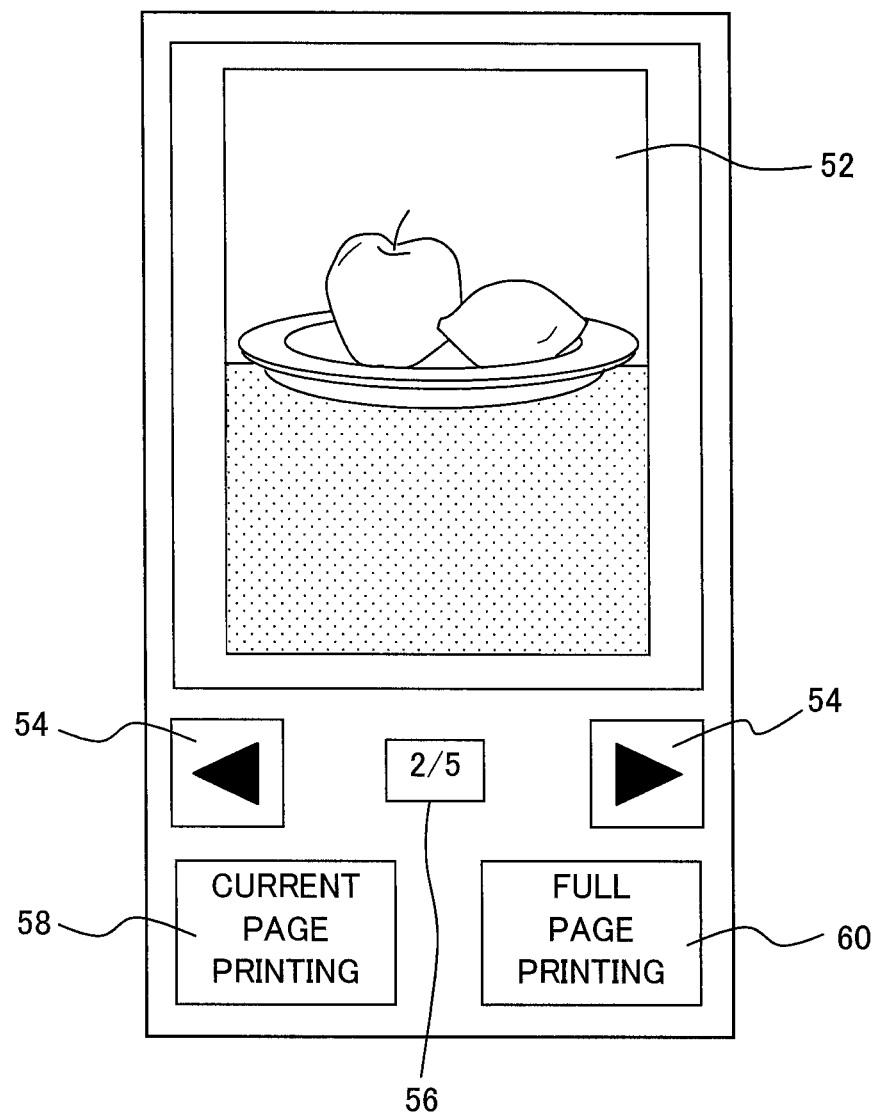
FIG. 4 shows an illustrative view illustrating an example of a preview image displayed on the portable terminal

In S220, the denial flag for the NFC printing is allowed to be turned off. In S230, the selected document file (file converted into the JPEG file) is previewed. FIG. 4 shows an example of the preview screen. As shown in FIG. 4, the preview screen includes a preview image 52, page switching buttons 54, page information 56, a current page print button 58, and a full page print button 60. The preview image 52 is displayed based on a processed data which is generated by processing the JPEG file by the OS 25. The user is capable of making a final judgment as to whether or not the printing is executed after confirming the preview image 52.

The page switching buttons 54 are buttons for allowing the user to select a page to be displayed. The page information 56 is information indicating the total number of pages included in the file selected by the user and a page number of the preview image 52 currently displayed. The user knows the page number of the currently-displayed preview image 52 by the page information 56 and operates each page switching button 54 appropriately, and thereby making it possible to display the preview image 52 of a page, which is desired to be displayed, on the display section 20. In a case that the user touches the current page print button 58, the printing app 26 makes a setting such that the processed data generated for displaying the currently-displayed preview image 52 is set as an object to be transmitted to the MFP 30 (object to be printed). On the other hand, in a case that the user touches the full page print button 60, the printing app 26 makes a setting such that the processed data for the full pages is set as the object to be transmitted to the MFP 30 (object to be printed).

In S240, the CPU 11 enters a print activation (print waiting) state and waits until the portable terminal 10 is held over the MFP 30. Noted that the processes for various input operations to the preview screen shown in FIG. 4 are omitted in FIGS. 2A and 2B (the processes are included in S230 to S240).

Figure 5A:
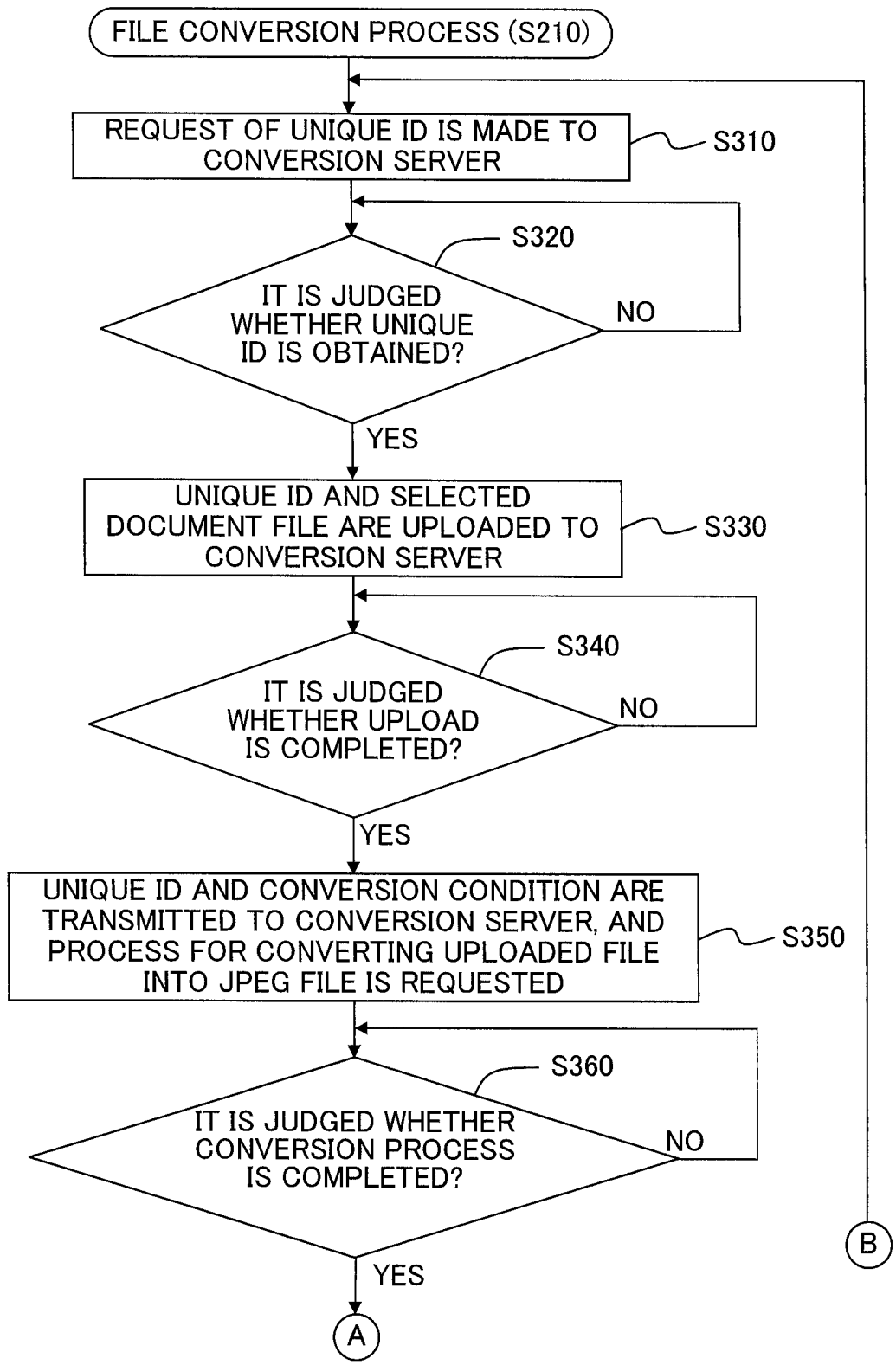
FIGS. 5A and 5B show a flowchart showing the detail of a file conversion process of S210 in FIGS. 2B.
Figure 5B:
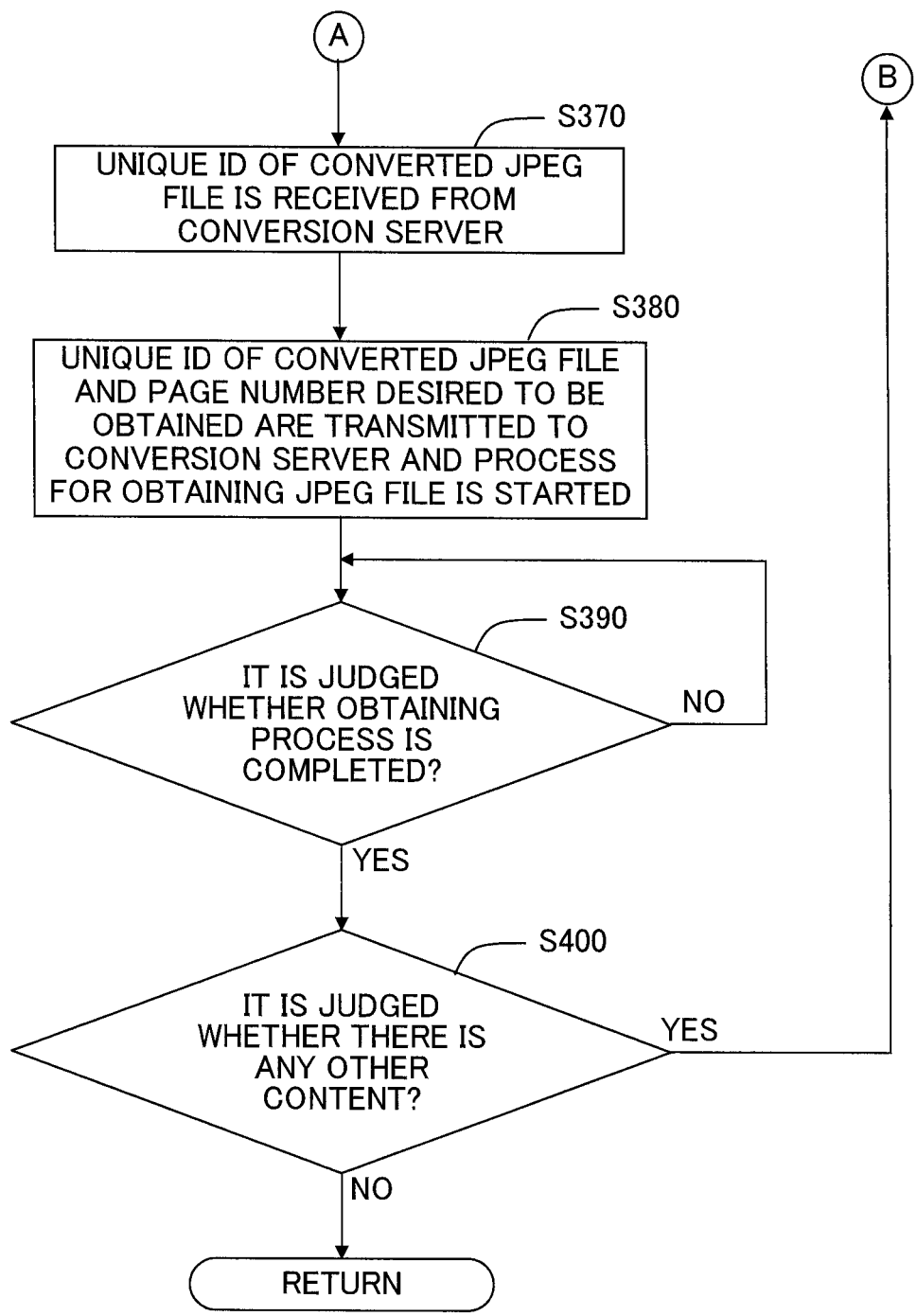

In a case that it is judged in S190 that there is no page converted into the JPEG file, the process proceeds to S220 through a file conversion process in S210. Details of the file conversion process in S210 are shown in FIGS. 5A and 5B. In S310, the request of a unique ID is made to the conversion server 7 via the normal Wi-Fi. In a case that the Wi-Fi connection between the portable terminal 10 and the internet 5 via the access point 3 is not established before the start of the process in S310, the Wi-Fi connection with the internet 5 and the access to the conversion server 7 are made, and then the process in S310 is started.

In S320, it is judged whether or not the unique ID is obtained from the conversion server 7. In a case that the unique ID is obtained, the obtained unique ID and the selected document file are uploaded to the conversion server 7 in S330. In S340, it is judged whether or not the upload of the document file to the conversion server 7 is completed.

In a case that the upload of the document file to the conversion server 7 has been completed, the unique ID and a conversion condition are transmitted to the conversion server 7 in S350. Then, the CPU 11 requests the conversion server 7 to convert the uploaded document file into the JPEG file. In S360, it is judged whether or not the conversion process at the conversion server 7 is completed. This judgment is made based on a particular response data transmitted from the conversion server 7. In a case that the conversion process at the conversion server 7 has been completed, the unique ID, which corresponds to the converted JPEG file, is received from the conversion server 7 in S370.

In S380, the unique ID received in S370 and the page number of a page, of pages included in the converted JPEG file, which is desired to be obtained, are transmitted to the conversion server 7, and then the process for obtaining the converted JPEG file is started. In a case that the current page print button 58 is touched in the preview screen of FIG. 4, the JPEG file corresponding to the page currently displayed is obtained. In a case that the full page print button 60 is touched in the preview screen of FIG. 4 or that neither the current page print button 58 nor the full page print button 60 are not touched, the JPEG files for the full pages are obtained. Noted that in a case that the download of the converted JPEG file has been completed, the CPU 11 allows the OS 25 to create a thumbnail data based on the downloaded JPEG file at a predetermined timing.

In S390, it is judged whether or not the process for obtaining the JPEG file is completed. In a case that the obtaining process has been completed, it is judged in S400 whether or not there is any other contents or files to be converted. In this embodiment, since it is basically configured such that one non-support file selected by the user is uploaded to the conversion server 7 and then is converted, it is usually judged in S400 that there is no content or file. If it is configured such that a plurality of document files can be selected and the selected document files are sequentially uploaded to the conversion server 7 and then are converted, it is judged in S400 that there is any other contents or files.

As described above, even when the user selects the document file (non-support file), the document file can be converted into the JPEG file supported by the OS 25 in the file conversion process of FIGS. 5A and 5B and the converted file can be printed by the MFP 30.

After the file conversion process of FIGS. 5A and 5B, the process proceeds to processes subsequent to S220 of FIGS. 2A and 2B. The denial flag for the NFC printing is allowed to be turned off (S220), the preview becomes available (S230), and the CPU 11 enters the print activation (print waiting) state (S240).

Figure 6B:
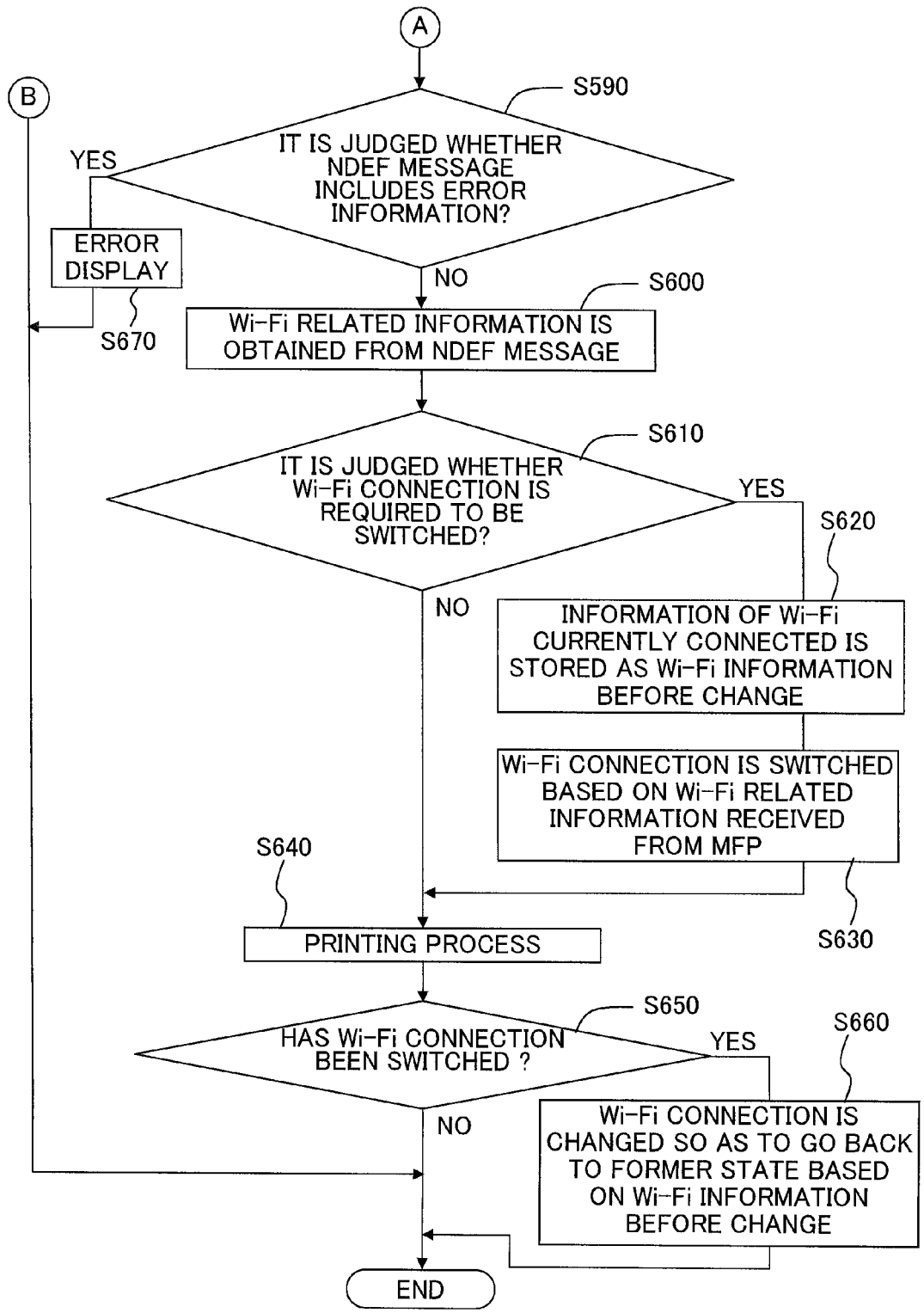

Next, the NFC printing process, of the main two processes executed by the CPU 11 of the portable terminal 10 for achieving the NFC printing, will be explained with reference to FIGS. 6A and 6B. Similar to the print accepting process shown in FIGS. 2A and 2B, the NFC printing process shown in FIGS. 6A and 6B is also one of programs configuring the printing app 26. After the operation of the CPU 11 of the portable terminal 10 is started, the CPU 11 repeatedly executes the NFC printing process at a predetermined cycle.

In a case that the NFC printing process of FIGS. 6A and 6B is started, the CPU 11 judges in S510 whether or not the portable terminal 10 is held over the MFP 30. In a case that the portable terminal 10 is not held over the MFP 30, the NFC printing process is completed. In a case that the portable terminal 10 is held over the MFP 30, the CPU 11 judges in S520 whether or not the denial flag for the NFC printing is turned on.

In a case that the denial flag for the NFC printing is turned on, the Wi-Fi connection with the internet 5 is required to be maintained, because the situation is such that the file is being converted by the conversion server 7, download of the converted file is not yet completed, or the like. Therefore, in the case that the denial flag for the NFC printing is turned on, a NDEF (NFC Data Exchange Format) message for rejecting the printing is created in S560, and the process proceeds to S570. In S570, the NDEF message is transmitted to the MFP 30 via the NFC. The NDEF is a NFC data interchange format and is used for data interchange at the time of the NFC.

On the other hand, in a case that the denial flag for the NFC printing is turned off, the Wi-Fi connection with the MFP 30 may be established. Therefore, in the case that the denial flag for the NFC printing is turned off, the CPU judges in S530 whether or not the Wi-Fi connection between the portable terminal 10 and any other device is currently established.

In a case that the Wi-Fi connection with any other device is not made, the process proceeds to S550. In a case that the Wi-Fi connection with any other device has been made, information of the Wi-Fi is obtained in S540, and the process proceeds to S550. In S540, in a case that the currently connected Wi-Fi is the normal Wi-Fi, it is obtained, for example, SSID as the Wi-Fi information. In a case that the currently connected Wi-Fi is the WFD, it is obtained, for example, a peer device as the Wi-Fi information.

In S550, the NDEF message including the Wi-Fi information is generated. That is, in a case that the Wi-Fi connection is not yet established, the NDEF message including the information that the Wi-Fi connection is not yet established is generated. In a case that the Wi-Fi connection with any other device is being made, the NDEF message including the information that the Wi-Fi connection with any other device is being made is generated. For example, the message includes the Wi-Fi information obtained in S540. In S570, the NDEF message generated in S550 or S560 is transmitted to the MFP 30 via the NFC.

In a case that the MFP 30 receives the NDEF message from the portable terminal 10, the MFP 30 judges whether or not the Wi-Fi connection with the portable terminal 10 has been already made based on the NDEF message. In a case that the Wi-Fi connection with the portable terminal 10 has been made, Wi-Fi related information indicating that the Wi-Fi connection is not required to be newly established is generated. Then, the NDEF message including the Wi-Fi related information is sent back to the portable terminal 10.

In a case that the Wi-Fi connection with the portable terminal 10 is not established, the MFP 30 generates the Wi-Fi related information required for the normal Wi-Fi connection such as SSID, a password, and a command for establishing the Wi-Fi connection. Then, the NDEF message including the Wi-Fi related information is sent back to the portable terminal 10.

In a case that the NDEF message from the portable terminal 10 indicates the rejection of printing, the NDEF message which includes error information indicating that the Wi-Fi connection should not be changed, namely, the printing data can not yet be transmitted to the MFP 30 is sent back to the portable terminal 10 by the MFP 30.

In S580, the NDEF message sent back from the MFP 30 is received. In S590, it is judged whether or not the received NDEF message includes the error information. In a case that the error information is included, an error display is displayed in S670 and the NFC printing process is completed. The error display of S670 is a display for allowing the user to recognize the situation that the printing data can not yet be transmitted to the MFP 30 and the Wi-Fi connection should be maintained. The error display is exemplified, for example, by the display showing "Printing is currently unavailable. Touch again after all of the pages are displayed". The error display may be displayed for a predetermined amount of time or until the download of the converted file has been completed. The period for displaying the error display may be determined as appropriate.

In other words, as long as the denial flag for the NFC printing is turned on, even when the user holds the portable terminal 10 over the MFP 30, the error display is displayed and the NFC printing can not be performed. In order to perform the NFC printing, it is necessary to wait until the file conversion and the download thereof are completed and the preview image is displayed. Since the denial flag for the NFC printing is turned off at a stage at which the download of the converted file has been completed and the preview image has been displayed, the NFC printing of the file can be performed by holding the portable terminal 10 over the MFP 30.

In a case that no error information is included in the NDEF message received from the MFP 30, the process proceeds to S600. In this case, it is considered that the situation is such that the Wi-Fi connection between the portable terminal 10 and the MFP 30 has already been established, that the Wi-Fi connection between the portable terminal 10 and any device other than the MFP 30 has been established, or that the portable terminal 10 is connected to no device via the Wi-Fi connection. In S600, it is obtained the Wi-Fi related information which is included in the NDEF message received from the MFP 30. In S610, it is judged whether or not the Wi-Fi connection is required to be switched based on the Wi-Fi related information. In the case that the Wi-Fi connection between the portable terminal 10 and the MFP 30 has already been established, the Wi-Fi connection is not required to be switched. Thus, the process proceeds to a printing process of S640.

In the case that the Wi-Fi connection between the portable terminal 10 and any device other than the MFP 30 has been established, or that the portable terminal 10 is connected to no device via the Wi-Fi connection, the Wi-Fi connection is required to be switched. In other words, the portable terminal 10 is required to be connected to the MFP 30. In this case, information such as SSID and the like of the Wi-Fi which is currently connected is stored as Wi-Fi information before change. Then, the Wi-Fi connection is switched to be connected with the MFP 30 based on the Wi-Fi related information received from the MFP 30 in S630. In particular, the normal Wi-Fi connection between the portable terminal 10 and the MFP 30 is established in accordance with the SSID and the like included as the Wi-Fi related information. After the Wi-Fi connection has been switched to be connected with the MFP 30, the process proceeds to the printing process of S640.

In the printing process of S640, for example, the request for data processing is made to the OS 25 and the file after the data processing is transmitted to the MFP 30 (transmission via the normal Wi-Fi). Then, the printing is performed by the MFP 30.

After the printing process, it is judged in S650 whether or not the Wi-Fi connection has been switched to perform the printing process. In a case that the Wi-Fi connection is not switched, the NFC printing process is completed. In a case that the Wi-Fi connection has been switched in S630, the Wi-Fi connection is changed in S660 so as to go back to the former state based on the Wi-Fi information before change, which was stored in S620 before performing the switch of Wi-Fi. That is, the Wi-Fi connection returns to the state before the Wi-Fi connection is switched.

According to the portable terminal 10 of this embodiment as described above, in the case that the non-support file is converted by the conversion server 7, even when the portable terminal 10 is held over the MFP 30 to obtain, from the MFP 30, the information about the Wi-Fi connection between the potable terminal 10 and the MFP 30, the Wi-Fi connection currently connected is not switched to the Wi-Fi connection with the MFP 30 unless the download of the converted JPEG file has been completed.

Therefore, even when the portable terminal 10 is held over the MFP 30 during the file conversion by the conversion server 7, the file conversion by the conversion server 7 is not discontinued, and the converted file can be obtained from the conversion server 7 via the normal Wi-Fi.

In the case that the portable terminal 10 is held over the MFP 30 during the file conversion by the conversion server 7, the error display is displayed on the display section 20. Thus, even when the user holds the portable terminal 10 over the MFP 30 during the file conversion, the user is capable of visually knowing the situation that the NFC printing can not be performed and taking an appropriate action.

Further, even when the Wi-Fi connection between the portable terminal 10 and an object as a connection destination (for example, the internet 5) has been switched to the Wi-Fi connection between the portable terminal 10 and the MFP 30 to perform the NFC printing, the Wi-Fi connection between the portable terminal 10 and the MFP 30 is changed to the Wi-Fi connection between the portable terminal 10 and the object as the communication destination after execution of the NFC printing to return to the former connection. Therefore, even when the user temporarily performs the NFC printing, the Wi-Fi connection goes back to the former state after the execution of the NFC printing, and it is possible to provide the portable terminal 10 of which usability is superior.

<Other Embodiment(s)>

The file format supported by the OS 25 of the portable terminal 10 is not limited to the JPEG file and the text file. Further, the file format which is not supported by the OS 25 of the portable terminal 10 is not limited to the PDF format and the DOC format. The PDF format, the DOC format, and the like are merely examples.

In the above embodiment, the wireless communication between the portable terminal 10 and the internet 5 and the wireless communication between the portable terminal 10 and the MFP 30 have been exemplified by the Wi-Fi, and another wireless communication between the portable terminal 10 and the MFP 30 has been exemplified by the NFC. However, the Wi-Fi and the NFC are merely examples, and any other communication system may be adopted.

In the above embodiment, the OS 25 of the portable terminal 10 has been exemplified by the Android. The Android, however, is merely an example, and the present teaching is applicable to any OS, provided that the OS does not support a certain file and the non-support file can not be subjected to the data processing for printing only by the OS function. For example, the iOS®(registered trademark of Cisco Systems) may be also adopted.

What is claimed is:

1. A communication terminal device configured to communicate with a printer, the device comprising:
    a memory configured to store at least one file;
    a display configured to display information;
    a selection operation accepting section configured to accept a selection operation for selecting specific information from among the information displayed on the display;
    a first wireless communication section configured to perform data communication with the printer by first wireless communication in compliance with first wireless communication protocol;
    a second wireless communication section configured to perform the data communication with the printer by second wireless communication in compliance with second wireless communication protocol which is different from the first wireless communication protocol; and
    a controller configured to execute:
    displaying the at least one file stored in the memory on the display;
    setting up a file, which is selected by the selection operation accepting section from among the at least one file displayed on the display, as a to-be printed file to be printed by the printer;
    causing the first wireless communication section to transmit, in a case that the to-be printed file is a file in a particular non-support format, the to-be printed file to a conversion device and causing the first wireless communication section to obtain a to-be printed file, which has been converted to a file in a particular support format at the conversion device, from the conversion device;
    changing a communication counterpart of the first wireless communication to the printer in a case that the second wireless communication between the communication terminal device and the printer is started after the setting of the to-be printed file and that the converted to-be printed image is not being obtained from conversion device, and maintaining the communication counterpart of the first wireless communication in a case that the converted to-be printed file is being obtained from conversion device; and
    causing the first wireless communication section to transmit the to-be printed file in the support format to the printer in the case that the communication counterpart of the first wireless communication has been changed to the printer.

2. The communication terminal device according to claim 1, wherein the controller is configured to:
    cause the second wireless communication section to obtain wireless connection information, which is required for the first wireless communication with the printer, from the printer via the second wireless communication, in the case that the second wireless communication between the communication terminal device and the printer is started; and
    change the communication counterpart of the first wireless communication to the printer based on the obtained wireless connection information.

3. The communication terminal device according to claim 2, wherein the controller is configured not to obtain the wireless connection information, in the case that the second wireless communication between the communication terminal device and the printer is started and that the converted to-be printed file is being obtained.

4. The communication terminal device according to claim 1, wherein the controller is configured to transmit particular notification information to the printer via the second wireless communication, in the case that the second wireless communication between the communication terminal device and the printer is started and that the converted to-be printed file is being obtained.

5. The communication terminal device according to claim 1, wherein the controller is configured to display particular display information on the display, in the case that the second wireless communication between the communication terminal device and the printer is started after the setting of the to-be printed file and that the converted to-be printed image is being obtained.

6. The communication terminal device according to claim 1, wherein a communication range in which the second wireless communication using the second wireless communication system is available is not greater than a communication range in which the first wireless communication using the first wireless communication system is available.

7. The communication terminal device according to claim 1, wherein the controller is configured to:
    store information before change which indicates a state of the first wireless communication immediately before the change of the communication counterpart of the first wireless communication, in the case that the communication counterpart of the first wireless communication is changed to the printer; and
    restore a state of the first wireless communication after the change to the state of the first wireless communication before the change, based on the information before change stored by the controller, in the case that the communication counterpart of the first wireless communication has been changed to the printer and that the to-be printed file has been transmitted to the printer completely.

8. A communication control method used in a communication terminal device configured to perform data communication with a printer by first wireless communication in compliance with first wireless communication protocol and by second wireless communication in compliance with second wireless communication protocol, which is different from the first wireless communication protocol, the method comprising:
    selecting a to-be printed file to be printed by the printer;
    transmitting, in a case that the selected to-be printed file is a file in a particular non-support format, the to-be printed file to a conversion device in compliance with the first wireless communication protocol, and obtaining a to-be printed file, which has been converted to a file in a particular support format at the conversion device, from the conversion device in compliance with the first wireless communication protocol;
    changing a communication counterpart of the first wireless communication to the printer in a case that the second wireless communication between the communication terminal device and the printer is started after the selection of the to-be printed file and that the converted to-be printed image is not being obtained, and maintaining the communication counterpart of the first wireless communication in a case that the converted to-be printed file is being obtained; and transmitting the to-be printed file in the support format to the printer in compliance with the first wireless communication protocol in the case that the communication counterpart of the first wireless communication has been changed to the printer.

9. A non-transitory computer-readable medium storing a communication control program executable by a controller of a communication terminal device, the communication terminal device comprising:

a memory configured to store at least one file;

a display configured to display information;

a selection operation accepting section configured to accept a selection operation for selecting specific information from among the information displayed on the display;

a first wireless communication section configured to perform data communication with the printer by first wireless communication in compliance with first wireless communication protocol; and a second wireless communication section configured to perform the data communication with the printer by second wireless communication in compliance with second wireless communication protocol which is different from the first wireless communication protocol, the communication control program being configured to execute:

displaying the at least one file stored in the memory on the display;

setting up a file, which is selected by the selection operation accepting section from among the at least one file displayed on the display, as a to-be printed file to be printed by the printer;

causing the first wireless communication section to transmit, in a case that the to-be printed file set by the communication control program is a file in a particular non-support format, the to-be printed file to a conversion device and causing the first wireless communication section to obtain a to-be printed file, which has been converted to a file in a particular support format at the conversion device, from the conversion device;

changing a communication counterpart of the first wireless communication to the printer in a case that the second wireless communication between the communication terminal device and the printer is started after the setting of the to-be printed file and that the converted to-be printed image is not being obtained, and maintaining the communication counterpart of the first wireless communication in a case that the converted to-be printed file is being obtained; and causing the first wireless communication section to transmit the to-be printed file in the support format to the printer in the case that the communication counterpart of the first wireless communication has been changed to the printer.

* * * * *